(12) United States Patent
Voutour et al.

(10) Patent No.: US 11,019,007 B1
(45) Date of Patent: May 25, 2021

(54) SYSTEMS AND METHODS FOR PROVIDING ELECTRONIC OFFICIAL DOCUMENTS

(71) Applicant: UNITED SERVICES AUTOMOBILE ASSOCIATION (USAA), San Antonio, TX (US)

(72) Inventors: Teddy Joseph Voutour, Helotes, TX (US); Charles Lee Oakes, III, Boerne, TX (US); Rickey Dale Burks, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 690 days.

(21) Appl. No.: 15/341,832

(22) Filed: Nov. 2, 2016

Related U.S. Application Data

(63) Continuation of application No. 11/487,072, filed on Jul. 13, 2006, now abandoned.

(51) Int. Cl.
| | | |
|---|---|---|
| *H04L 12/58* | (2006.01) | |
| *H04L 29/08* | (2006.01) | |
| *G06Q 40/08* | (2012.01) | |
| *G06F 40/14* | (2020.01) | |
| *G06F 40/106* | (2020.01) | |
| *G06Q 50/18* | (2012.01) | |

(52) U.S. Cl.
CPC ............ *H04L 51/08* (2013.01); *G06F 40/106* (2020.01); *G06F 40/14* (2020.01); *G06Q 40/08* (2013.01); *H04L 67/02* (2013.01); *G06Q 50/18* (2013.01)

(58) Field of Classification Search
CPC ......... H04L 51/08; H04L 67/02; G06Q 40/08; G06Q 50/18; G06F 40/106; G06F 40/14

USPC ............................................................ 705/4
See application file for complete search history.

(56) References Cited

U.S. PATENT DOCUMENTS

| | | | |
|---|---|---|---|
| 4,831,526 A | 5/1989 | Luchs et al. | |
| 5,523,942 A | 6/1996 | Tyler et al. | |
| 5,537,315 A | 7/1996 | Mitcham | |
| 5,655,085 A | 8/1997 | Ryan et al. | |
| 5,872,848 A | 2/1999 | Romney et al. | |
| 5,991,740 A | 11/1999 | Messer | |
| 6,026,364 A | 2/2000 | Whitworth | |
| 6,256,672 B1 | 7/2001 | Redpath | |
| 6,272,472 B1 | 8/2001 | Danneels et al. | |
| 6,286,761 B1 * | 9/2001 | Wen ...................... | G06K 19/10 235/468 |
| 6,324,569 B1 | 11/2001 | Ogilvie et al. | |

(Continued)

OTHER PUBLICATIONS

"Electronic Document Authentication," by Robert R. Jueneman. IEEE Network Magazine. pp. 17-23. vol. 1, No. 2, Apr. 1987. (Year: 1987).*

(Continued)

*Primary Examiner* — Sara C Hamilton
(74) *Attorney, Agent, or Firm* — Baker & Hostetler, LLP

(57) ABSTRACT

The present innovation pertains to providing an electronic representation of an official document, such as proof of insurance, to an electronic handheld devices: The handheld electronic device may utilize a Web browser to access the representation of the official document, or may request a copy through e-mail, and the representation of the official document may be digitally signed for enhanced proof of authenticity.

11 Claims, 5 Drawing Sheets

(56) References Cited

U.S. PATENT DOCUMENTS

| | | | |
|---|---|---|---|
| 6,367,013 B1* | 4/2002 | Bisbee | G06Q 20/00 |
| | | | 713/158 |
| 6,415,277 B1 | 7/2002 | Klatt et al. | |
| 6,442,263 B1 | 8/2002 | Beaton et al. | |
| 6,491,215 B1* | 12/2002 | Irwin, Jr. | A63F 3/0665 |
| | | | 235/375 |
| 6,549,935 B1 | 4/2003 | Lapstun et al. | |
| 6,609,114 B1 | 8/2003 | Gressel et al. | |
| 6,622,015 B1 | 9/2003 | Himmel et al. | |
| 6,671,805 B1 | 12/2003 | Brown et al. | |
| 6,694,315 B1 | 2/2004 | Grow | |
| 6,934,909 B2 | 8/2005 | Tewari | |
| 6,993,505 B1 | 1/2006 | Katz et al. | |
| 7,162,635 B2 | 1/2007 | Bisbee et al. | |
| 7,254,556 B2 | 8/2007 | Fry | |
| 7,295,677 B2 | 11/2007 | Simpson et al. | |
| 7,349,860 B1 | 3/2008 | Wallach et al. | |
| 7,398,220 B1 | 7/2008 | Hayes | |
| 7,676,439 B2 | 3/2010 | Tattan et al. | |
| 7,715,593 B1* | 5/2010 | Adams | G06Q 20/327 |
| | | | 340/5.53 |
| 2001/0002485 A1 | 5/2001 | Bisbee et al. | |
| 2001/0034771 A1 | 10/2001 | Hutsch et al. | |
| 2002/0026478 A1 | 2/2002 | Rodgers et al. | |
| 2002/0128969 A1 | 9/2002 | Parmelee et al. | |
| 2002/0178015 A1 | 11/2002 | Zee | |
| 2002/0188845 A1* | 12/2002 | Henderson | G06Q 20/02 |
| | | | 713/168 |
| 2002/0194118 A1 | 12/2002 | Nassar | |
| 2002/0194120 A1 | 12/2002 | Russell et al. | |
| 2003/0014445 A1 | 1/2003 | Formanek et al. | |
| 2003/0046112 A1 | 3/2003 | Dutta et al. | |
| 2003/0076932 A1 | 4/2003 | Andrew | |
| 2003/0079134 A1 | 4/2003 | Manchala et al. | |
| 2003/0093302 A1 | 5/2003 | Quido et al. | |
| 2003/0097570 A1* | 5/2003 | Wheeler | G06F 21/32 |
| | | | 713/180 |
| 2003/0126259 A1 | 7/2003 | Yoshida et al. | |
| 2003/0128375 A1* | 7/2003 | Ruhl | H04N 1/32128 |
| | | | 358/1.6 |
| 2003/0138128 A1* | 7/2003 | Rhoads | G06K 1/121 |
| | | | 382/100 |
| 2003/0163403 A1* | 8/2003 | Chen | G06Q 40/06 |
| | | | 705/36 R |
| 2003/0191703 A1* | 10/2003 | Chen | G06Q 40/02 |
| | | | 705/36 R |
| 2003/0233278 A1 | 12/2003 | Marshall | |
| 2003/0233542 A1* | 12/2003 | Benaloh | H04L 9/321 |
| | | | 713/156 |
| 2003/0236747 A1 | 12/2003 | Sager | |
| 2004/0044949 A1 | 3/2004 | Rowe | |
| 2004/0049424 A1 | 3/2004 | Murray et al. | |
| 2004/0093493 A1 | 5/2004 | Bisbee et al. | |
| 2004/0128512 A1* | 7/2004 | Sharma | G06Q 20/3823 |
| | | | 713/176 |
| 2004/0158724 A1* | 8/2004 | Carr | B42D 25/00 |
| | | | 713/186 |
| 2004/0160313 A1 | 8/2004 | McCarthy et al. | |
| 2004/0181671 A1* | 9/2004 | Brundage | G06T 1/0071 |
| | | | 713/176 |
| 2004/0196506 A1 | 10/2004 | Izumi et al. | |
| 2004/0215587 A1 | 10/2004 | Bertrand et al. | |
| 2004/0249695 A1 | 12/2004 | Clark et al. | |
| 2004/0250085 A1 | 12/2004 | Tattan et al. | |
| 2005/0060257 A1 | 3/2005 | Fry | |
| 2005/0066172 A1* | 3/2005 | Vorbruggen | G06F 21/64 |
| | | | 713/176 |
| 2005/0099320 A1 | 5/2005 | Nath et al. | |
| 2005/0125669 A1 | 6/2005 | Stewart et al. | |
| 2005/0132194 A1* | 6/2005 | Ward | G06Q 20/341 |
| | | | 713/176 |
| 2006/0004762 A1 | 1/2006 | Berning et al. | |
| 2006/0075245 A1* | 4/2006 | Meier | G06F 21/64 |
| | | | 713/176 |
| 2006/0095304 A1 | 5/2006 | Madison et al. | |
| 2006/0100944 A1 | 5/2006 | Reddin et al. | |
| 2006/0115110 A1* | 6/2006 | Rodriguez | B41M 3/10 |
| | | | 382/100 |
| 2006/0133340 A1* | 6/2006 | Rybak | H04L 51/066 |
| | | | 370/338 |
| 2006/0157559 A1* | 7/2006 | Levy | G06K 17/00 |
| | | | 235/380 |
| 2007/0002388 A1* | 1/2007 | Henry | G06Q 10/107 |
| | | | 358/400 |
| 2007/0008574 A1* | 1/2007 | Henry | G06Q 10/107 |
| | | | 358/1.15 |
| 2007/0066343 A1 | 3/2007 | Silverbrook et al. | |
| 2007/0073612 A1 | 3/2007 | Smith et al. | |
| 2007/0078689 A1 | 4/2007 | Zubak et al. | |
| 2007/0143595 A1* | 6/2007 | Girard | H04L 9/3247 |
| | | | 713/156 |
| 2007/0162742 A1* | 7/2007 | Song | H04L 63/0823 |
| | | | 713/156 |
| 2007/0271464 A1* | 11/2007 | Rico Novella | G06Q 10/107 |
| | | | 713/181 |
| 2008/0022089 A1 | 1/2008 | Leedom | |
| 2008/0120245 A1 | 5/2008 | Humphreys et al. | |
| 2008/0133924 A1* | 6/2008 | Gadau | G06F 21/335 |
| | | | 713/176 |
| 2008/0224823 A1* | 9/2008 | Lawson | G06F 21/34 |
| | | | 340/5.8 |
| 2008/0252412 A1 | 10/2008 | Larsson et al. | |
| 2009/0201129 A1 | 8/2009 | Lane et al. | |

OTHER PUBLICATIONS

Barnes R. et al. "Applying the Biometric Fusion Approach to Trusted Identity Programs: Part 1: Defining the Issues", LaserCard Systems Corporation, Apr. 2002, 1-4 pgs.

Georgia Electronic Insurance Compliance System (GEICS), "2003 Legislative Session Update", 2003 2 pgs.

"Interagency Electronic Document Exchange", Mar. 6, 2002, 4 pgs.

"LaserCard Systems Corporation", Proposal M1/02-0240, Oct. 22, 2002, 1-7 pgs.

Government of Malaysia, "Electronic Government Flagship Application: Blueprint for Electronic Government Implementation", Malaysian Administrative Modernization and Management Planning Unit (MAMPU), 1997, 1-153 pgs.

"Automobile Insurance Made Easy", Texas Department of Insurance, [Online]. [Downloaded Apr. 10 2007]. Retrieved from the Internet: <URL: http://www.tdi.state.tx.us/consumer/cb020.html>, (2006), 14 pgs.

"Claims Adjusters, Appraisers, Examiners, and Investigators", U.S. Department of Labor, Occupational Outlook Handbook, [Online]. [Downloaded Apr. 10, 2007]. Retrieved from the Internet: <URL: http://www.bls.qov/oco/ocos125.htm>, (2006), 9 pgs.

"Equifax Credit Watch TM Gold Family Program: Protect Your Family From the Pain of Identity Theft", Equifax, [Online]. [Downloaded Apr. 10, 2007]. Retrieved from the Internet: <URL: https://www.econsumer.equifax.com/consumer/sitepage.ehtml?forward=fesng_detail>, (2007) 2 pgs.

"Equifax Products: Get Triple the Protection with 3 in 1 Monitoring", Equifax, [Online]. [Downloaded Apr. 10, 2007]. Retrieved from the Internet: <URL: https://www.econsumer.equifax.com/consumer/sitepage.ehtml?forward=products>, (2007), 3 pgs.

"Mandatory insurance," WA State Department of Licensing, [Online]. [Downloaded Apr. 10, 2007]. Retrieved from the Internet: <URL: http:www.dol.wa.gov/driverslicense/insurance.html>, (2007) 2 pgs.

"Reward Credit Cards," Credit Cards.com, [Online]. Retrieved from the Internet: <URL: http:www.creditcards.com/reward.php>, downloaded Apr. 10, 2007, 6 pgs.

"U.S. Appl. No. 11/735,345, Non Final Office Action dated Oct. 2, 2008", 9 pgs.

"U.S. Appl. No. 11/735,345, Response filed Mar. 2, 2009 to Non Final Office Action dated Oct. 2, 2008", 13 pgs.

(56) References Cited

OTHER PUBLICATIONS

"U.S. Appl. No. 11/486,859, Non Final Office Action dated Oct. 28, 2008", 21 pgs.

"U.S. Appl. No. 11/486,859, Response filed Jan. 28, 2009 to Non Final Office Action dated Oct. 28, 2008", 15 pgs.

"U.S. Appl. No. 11/735,345, Examiner Interview Summary dated Jan. 29, 2009", 2 Docs.

"U.S. Appl. No. 11/486,859, Final Office Action dated Apr. 14, 2009", 25 pgs.

"U.S. Appl. No. 11/486,792, Non Final Office Action dated Apr. 16, 2009", 17 pgs.

"U.S. Appl. No. 11/486,792, Response filed Aug. 17, 2009 to Non Final Office Action dated Apr. 16, 2009", 20 pgs.

"U.S. Appl. No. 11/486,840, Non Final Office Action dated Apr. 28, 2009", 18 pgs.

"U.S. Appl. No. 11/375,339, Non Final Office Action dated Jun. 24, 2009", 18 pgs.

"U.S. Appl. No. 11/735,325, Non Final Office Action dated Jun. 24, 2009", 8 pgs.

"U.S. Appl. No. 11/735,325, Response filed Dec. 23, 2009 to Non Final Office Action dated Jun. 24, 2009", 9 Docs.

"U.S. Appl. No. 11/735,345, Restriction Requirement dated Jun. 24, 2009", 6 pgs.

"U.S. Appl. No. 11/487,189, Non Final Office Action dated Sep. 18, 2009", 15 pgs.

"U.S. Appl. No. 11/487,189, Response filed Dec. 18, 2009 to Non Final Office Action dated Sep. 18, 2009", 14 pgs.

"U.S. Appl. No. 11/486,792, Final Office Action dated Dec. 11, 2009", 15 pgs.

"U.S. Appl. No. 11/486,792, Response filed Mar. 11, 2010 to Final Office Action dated Dec. 11, 2009", 12 pgs.

"U.S. Appl. No. 11/487,189, Final Office Action dated Apr. 1, 2010", 14 pgs.

"U.S. Appl. No. 11/735,325, Final Office Action dated Apr. 6, 2010", 8 pgs.

"U.S. Appl. No. 11/735,325, Response filed Jul. 6, 2010 to Final Office Action dated Apr. 6, 2010", 8 pgs.

"U.S. Appl. No. 11/487,189, Response filed Jul. 1, 2010 to Final Office Action dated Apr. 1, 2010", 15 pgs.

"U.S. Appl. No. 11/486,792, Non Final Office Action dated Mar. 4, 2011", 11 pgs.

"U.S. Appl. No. 11/486,792, Response filed Jul. 1, 2011 to Non Final Office Action dated Mar. 4, 2011", 13 pgs.

\* cited by examiner

SYSTEMS AND METHODS FOR PROVIDING ELECTRONIC OFFICIAL DOCUMENTS

CROSS REFERENCE TO RELATED APPLICATIONS

This application claims priority to and is a continuation of U.S. patent application Ser. No. 11/487,072 filed on Jul. 13, 2006 which is related by subject matter to that which is disclosed in the following commonly assigned application: U.S. patent application Ser. No. 11/486,840 filed on Jul. 13, 2006, U.S. patent application Ser. No. 11/487,189 filed on Jul. 13, 2006, U.S. patent application Ser. No. 11/486,859 filed on Jul. 13, 2006, U.S. patent application Ser. No. 11/486,792 filed on Jul. 13, 2006, the entirety of each application is hereby incorporated by reference herein.

TECHNOLOGY FIELD

The present systems and methods relate generally to electronic document processes, and, more particularly, to systems and methods for providing an official document, such as a proof of insurance, in an electronic format that can be displayed in a handheld electronic device to a person requesting a copy of the official document.

BACKGROUND

The concept of an official document (i.e. a document that states some contractual relationship or grants some right) is ubiquitous in modem society. Such documents include permits, licenses, registrations, membership cards, insurance information (proof of insurance) cards and certifications. These documents are usually on paper, even though the information used to prepare these documents are kept in electronic form. In the context of this application an official document is to be distinguished from an ID (identification) that is intended to establish the identity of the person with the ID, although in some cases an official document may be used as an ID as for example in the case of a driver's license.

Official documents are created so that the person holding the official document may demonstrate to another person that a contractual relationship or right exists, and is associated with the person presenting the official document. These documents typically carry an indicia of the issuing authority. This may take the form of the seal (e.g. USPTO seal), a notarization, or some other symbol.

One type of official document in common use is the proof of insurance card. Many states require that drivers be able to establish that the drivers can pay for accidents that they cause. Insurance companies provide their policyholders with proof of insurance cards to satisfy this requirement. Some states require that the driver be able to show proof of insurance when asked by a law enforcement officer. Acceptable proof of insurance may be an original or photocopy of an automobile insurance identification card issued by the insurance company. Some states require that the insurance identification card have a barcode readable by a Department of Motor Vehicles (DMV) barcode reader.

Other states (e.g. Georgia) maintain a database of valid insurance policies in a state vehicle tax record and will not accept insurance information cards issued by insurance companies as proof of insurance. Each insured is nonetheless required to have in his/her possession an insurance information card for when they travel in another state and/or are involved in an accident. Insurance companies, agents and any other insurers issuing or renewing any policy of motor vehicle liability insurance are required to provide all the insurance information to the DMVS within 30 days that coverage begins. Upon writing a policy, the insurance company uploads to the state's computers with the vehicle's identification number (VIN) and the policy's effective date for the insured. That information is cross-referenced with the tag database, which also tracks vehicles by their VIN. Police officers in Georgia can now pull up vehicles registration and insurance information from mobile computer systems.

One of the disadvantages posed by paper insurance information cards (e.g., paper proof of insurance cards) is that many times the insured misplaces the card and is unable to show proof of insurance to a police officer when a traffic stop is made. This sometimes leads to a citation, and additional time expended by the insured and the DMV in later accommodating the insured's efforts to demonstrate that the insured indeed had coverage. Another disadvantage is that there is a significant cost to the insurance companies associated with the printing and mailing of paper insurance information cards and replacement cards.

With the increasing adoption of handheld electronic devices with wireless capabilities and wireless access to the Internet, it is desirable to provide users with official documents that may be stored and displayed through such handheld electronic devices. Although the penetration and usage of handheld electronic devices may not reach 100%, there is a need to provide official documents in electronic format in addition to a paper format. In particular, there is a need to provide insurance information that can serve as proof of insurance through handheld electronic devices.

SUMMARY

An aspect of the systems and methods in this disclosure is to display an official document associated with a user in a user's handheld electronic device so that the official document can be presented to a person requesting the official document. The official document may be transmitted in a digital graphic format to the handheld electronic device so that it can be displayed on the screen of the handheld electronic device.

Another aspect of the systems and methods in this disclosure is to demonstrate insurance coverage through a handheld electronic device by requesting and receiving digital information representing an electronic representation of a proof of insurance card from an insurance company.

Yet another aspect of the systems and methods in this disclosure is to create and provide an electronic representation of an insurance information document to the user of a handheld device by retrieving insurance information from an insurance company data source and creating a graphical format file of the insurance information document.

Yet another aspect of the systems and methods in this disclosure is to create and provide an electronic representation of an official document to a user's handheld device that includes an electronic representation copy of the official document a digital signature indicating the source of the official document.

BRIEF DESCRIPTION OF THE DRAWINGS

The foregoing Summary, as well as the following detailed description, is better understood when read in conjunction with the appended drawings. For illustrating the claimed subject matter, there is shown in the drawings example constructions of various embodiments; however, the systems and methods disclosed herein are not limited to the specific methods and instrumentalities illustrated in the drawings. In the drawings:

DETAILED DESCRIPTION OF ILLUSTRATIVE EMBODIMENTS

Example Computing Devices

Figure 1:
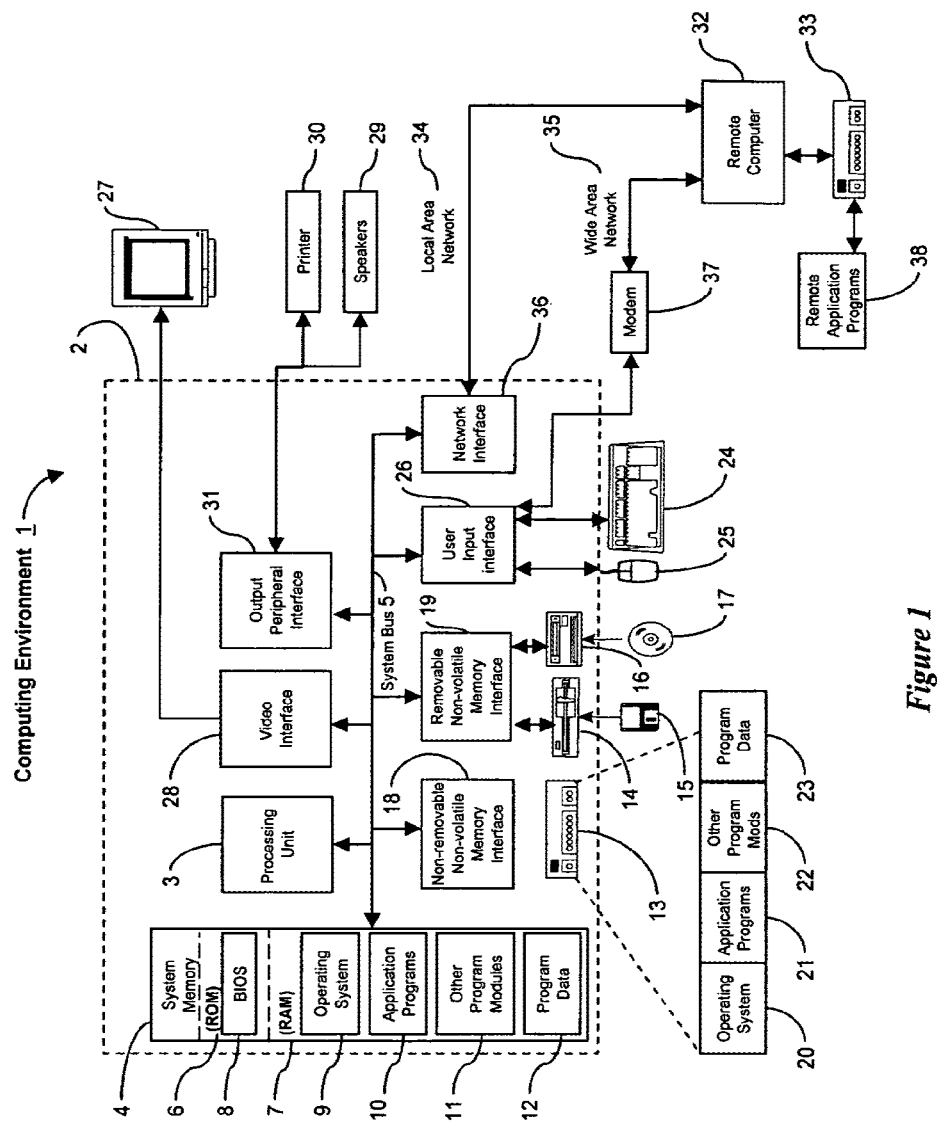
FIG. 1 is a block diagram illustrating an exemplary computing device suitable for implementing the processes in this disclosure.

Referring to FIG. 1, shown is a block diagram representing an exemplary computing device suitable for use in conjunction with implementing the processes described above. For example, the computer executable instructions that carry out the processes and methods for remotely authenticating credit card transactions may reside and/or be executed in such a computing environment as shown in FIG. 1. The computing system environment 1 is only one example of a suitable computing environment and is not intended to suggest any limitation as to the scope of use or functionality of the methods, systems and computer-readable media of this application. Neither should the computing environment 1 be interpreted as having any dependency or requirement relating to any one or combination of components illustrated in the exemplary computing environment 1.

Aspects of the methods, systems and computer-readable media of this application are operational with numerous other general purpose or special purpose computing system environments or configurations. Examples of well known computing systems, environments, and/or configurations that may be suitable for use with the the methods, systems and computer-readable media of this application include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the the methods, systems and computer-readable media of this application may be implemented in the general context of computer-executable instructions, such as program modules, being executed by a computer. Generally, program modules include routines, programs, objects, components, data structures, etc. that perform particular tasks or implement particular abstract data types. Aspects of the the methods, systems and computer-readable media of this application may also be practiced in distributed computing environments where tasks are performed by remote processing devices that are linked through a communications network. In a distributed computing environment, program modules may be located in both local and remote computer storage media including memory storage devices.

An exemplary system for implementing aspects of the the methods, systems and computer-readable media of this application includes a general purpose computing device in the form of a computer 2. Components of computer 2 may include, but are not limited to, a processing unit 3, a system memory 4, and a system bus 5 that couples various system components including the system memory 4 to the processing unit 3. The system bus 5 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard.

Computer 2 typically includes a variety of computer readable media. Computer readable media can be any available media that can be accessed by computer 2 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 4 includes computer storage media in the form of volatile and/or nonvolatile memory such as read only memory (ROM) 6 and random access memory (RAM) 7. A basic input/output system 8 (BIOS), containing the basic routines that help to transfer information between elements within computer 2, such as during start-up, is typically stored in ROM 6. RAM 7 typically contains data and/or program modules that are immediately accessible to and/or presently being operated on by processing unit 3. By way of example, and not limitation, FIG. 1 illustrates operating system 9, application programs 10, other program modules 11, and program data 12.

The computer 2 may also include other removable/non-removable, volatile/nonvolatile computer storage media. By way of example only, FIG. 1 illustrates a hard disk drive 13 that reads from or writes to non-removable, nonvolatile magnetic media, a magnetic disk drive 14 that reads from or writes to a removable, nonvolatile magnetic disk 15, and an optical disk drive 16 that reads from or writes to a removable, nonvolatile optical disk 17 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 13 is typically connected to the system bus 5 through an non-removable memory interface such as interface 1 &, and magnetic disk drive 14 and optical disk drive 16 are typically connected to the system bus 5 by a removable memory interface, such as interface 19.

The drives and their associated computer storage media discussed above and illustrated in FIG. 1, provide storage of computer readable instructions, data structures, program modules and other data for the computer 2. In FIG. 1, for example, hard disk drive 13 is illustrated as storing operating system 20, application programs 21, other program modules 22, and program data 23. Note that these components can either be the same as or different from operating system 9, application programs 10, other program modules 11, and program data 12. Operating system 20, application programs 21, other program modules 22, and program data 23 are given different numbers here to illustrate that, at a minimum, they are different copies. A user may enter commands and information into the computer 2 through input devices such as a keyboard 24 and pointing device 25, commonly referred to as a mouse, trackball or touch pad. Other input devices (not shown) may include a microphone, joystick, game pad, satellite dish, scanner, or the like. These and other input devices are often connected to the processing unit 3 through a user input interface 26 that is coupled to the system bus, but may be connected by other interface and bus structures, such as a parallel port, game port or a universal serial bus (USB). A monitor 27 or other type of display device is also connected to the system bus 5 via an interface, such as an insecure or secure video interface 28. An exemplary secure video standard would be the High-Definition Multimedia Interface (HDMI) standard. In addition to the monitor, computers may also include other peripheral output devices such as speakers 29 and printer 30, which may be connected through an output peripheral interface 31.

The computer 2 may operate in a networked environment using logical connections to one or more remote computers, such as a remote computer 32. The remote computer 32 may be a personal computer, a server, a router, a network PC, a peer device or other common network node, and typically includes many or all of the elements described above relative to the computer 2, although only a memory storage device 33 has been illustrated in FIG. 1. The logical connections depicted in FIG. 1 include a local area network (LAN) 34 and a wide area network (WAN) 35, but may also include other networks. Such networking environments are commonplace in offices, enterprise-wide computer networks, intranets and the Internet.

When used in a LAN networking environment, the computer 2 is connected to the LAN 34 through a network interface or adapter 36. When used in a WAN networking environment, the computer 2 typically includes a modem 37 or other means for establishing communications over the WAN 35, such as the Internet. The modem 37, which may be internal or external, may be connected to the system bus 5 via the user input interface 26, or other appropriate mechanism. In a networked environment, program modules depicted relative to the computer 2, or portions thereof, may be stored in the remote memory storage device. By way of example, and not limitation, FIG. 1 illustrates remote application programs 38 as residing on memory device 33. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the the methods, systems and computer-readable media of this application, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus or practicing the the methods, systems and computer-readable media of this application. In the case of program code execution on programmable computers, the computing device generally includes a processor, a storage medium readable by the processor (including volatile and nonvolatile memory and/or storage elements), at least one input device, and at least one output device. One or more programs that may implement or utilize the processes described in connection with the the methods, systems and computer-readable media of this application, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the the methods, systems and computer-readable media of this application in the context of one or more stand-alone computer systems, the the methods, systems and computer-readable media of this application is not so limited, but rather may be implemented in connection with any computing environment, such as a network or distributed computing environment. Still further, aspects of the the methods, systems and computer-readable media of this application may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the the methods, systems and computer-readable media of this application should not be limited to any single embodiment, but rather should be construed in breadth and scope in accordance with the appended claims.

Figure 2:
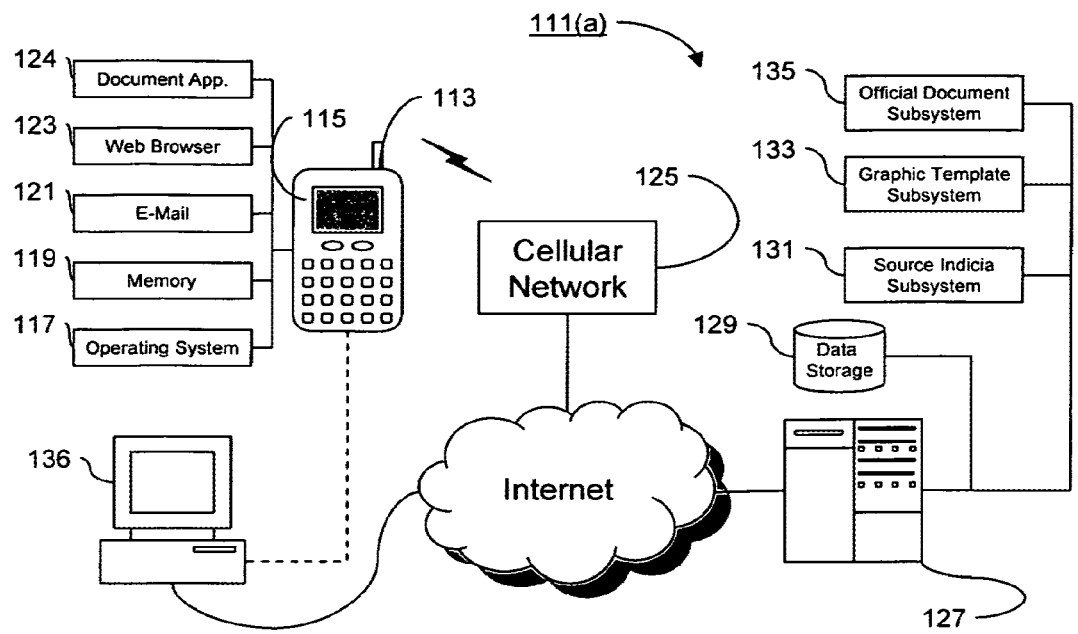
FIG. 2 is a schematic illustrating a system for providing and displaying an electronic official document.

Illustrated in FIG. 2 is a system 111(*a*) for providing and displaying an electronic official document. The system includes a handheld electronic device 113 provided within a display screen 115 capable of displaying high-resolution graphics. Examples of handheld electronic devices would include cell phones, personal digital assistants (PDAs), BlackBerry® devices; iPods and the like. Although in the embodiment illustrated in FIG. 2 the handheld electronic device is a wireless, internet capable, device, stand-alone devices that can be coupled to a desktop PC for the downloading information from a web site may also be used. A typical handheld electronic device 113 with wireless capability would include an operating system 117, a memory subsystem 119, an e-mail subsystem 121 and a Web browser subsystem 123. The system may also include a document application 124 used-to access stored electronic documents, and provide other functionality further described herein. The handheld electronic device 13 with wireless capability would connect through a cellular network 125 to the Internet through which it can access a plurality of web sites. One such a web site may be one that includes access to official documents associated with the user of the handheld electronic device 13. A typical configuration would include a web server 127 capable of providing a plurality of what pages responsive to user access to a web site. Also included would be a data storage system 129 containing data about the official documents. For example if the official document is a title to property, the data storage system may include data relating to the owner, the property, lien information, among other data. If the property were an automobile, the data would include a vehicle identification number (VIN) and odometer mileage. If the official document is an automobile insurance information card, depending on the state where the insured vehicle is located, the data store may include the name of the insured, the policy number, a description of the vehicle insured, and a VIN, among other information. The typical official document includes the identification of a person or entity, and a description of the contractual relationship or other rights that are associated with that person or entity. The official document also includes indicia of the issuing source of the official document. In a system that provides electronic official documents, the system would include a source indicia subsystem 131, a graphic template subsystem 133 and an official document subsystem 135. The official document subsystem 135 is in effect a database that can find records in data storage 129 that may be associated with an individual's name, or other fields in the records contained data storage 129. The graphics templates subsystem 133 generates a file in a graphic format where the fields extracted from the data store 129 by the official document subsystem 135 may be inserted to create a file that can be converted into the graphic image of the official document.

File formats help to identify what kind of file is being worked with and are usually distinguished by the file extension. Most computer applications have a native file format, i.e., a default format for files created in a specific application. There are three primary graphic file formats for Web images: GIF (Graphic Interchange Format), JPEG (Joint Photographic Experts Group), and PNG (Portable Network Graphics). Each of these graphic file formats is cross-platform and uses some form of compression. Another format that can be used to encode the exact look of a document in a device independent way is the Portable Document Format (PDF). The PDF format is an open standard file format, developed by Adobe Systems, for representing two dimensional documents in a device independent and resolution independent format. PDF files encode information in a way that is agnostic to the application software, hardware, or operating system used to create or view the document. The advantage of this feature is that a valid PDF file can be presented without aberrations regardless of its origin or destination. Yet another type of file format that can be used for graphics is Tagged Image File Format (TIFF). TIFF is a file format used for storing images, including photographs and line art. TIFF is a popular format for high color depth images, along with JPEG and PNG.

The methods implemented by the system 111(a) are described in more detail below. At a high level, in some embodiments the method implemented would include transmitting an electronic request for the official document using the Web browser subsystem 123 in the handheld electronic device 113. The request would be transmitted through the cellular network and the Internet to the server 127. The official document subsystem 35 searches the data storage 129 for records correlated to the information and the request. Once the record is retrieved a graphic templates subsystem 143 integrates the data in the record into a file having a graphical format that can display the image of the official document. The file is transmitted back to the handheld electronic device 113 through the Internet and cellular network 125, along with an indicia of the source of the file provided by source indicia subsystem 131.

Although the system and method described above illustrate a process for and directly sending an electronic official document to the handheld electronic device 113; it should be apparent to one of ordinary skill in the art that the electronic official document may be sent to a personal computer 136 from which it can be downloaded to a coupled handheld electronic device 113.

The document application 124 may be provided with additional functionality, such as a database management system to store, classify, and access multiple electronic official documents. For example, membership cards, proof of insurance, and various permits may be managed through a database management system included in document application 124. Additionally, document application 124 may be configured to access all of the information necessary for the electronic request of the electronic official document.

Figure 3:
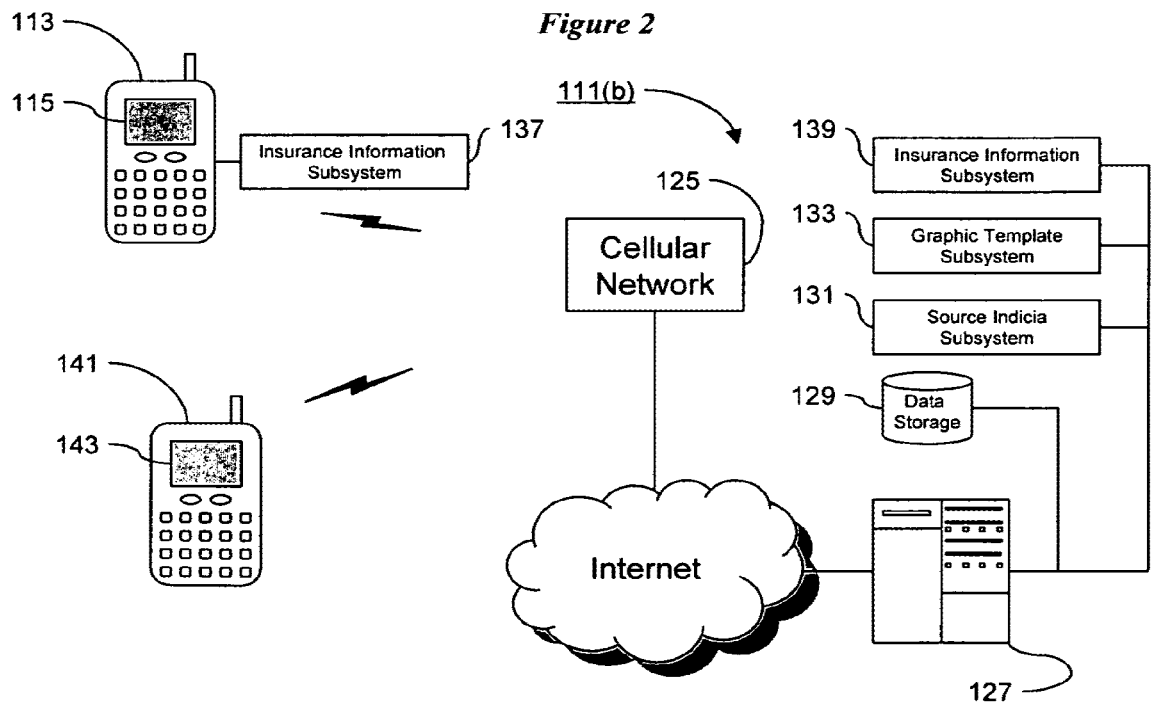
FIG. 3 is a use a schematic illustrating a system for providing and displaying an electronic insurance information card and proof of insurance.

Illustrated in FIG. 3 is an alternate embodiment of the system 111(b). In this embodiment the handheld mobile device 113 is of the same type as the one illustrated in FIG. 2, but may optionally include an insurance information subsystem 137. The insurance information subsystem 137 is an application that includes all of the necessary data for making a request for an electronic insurance card. The application may include the URL for the web site where the insurance information card may be obtained, the information relating to the user, and other relevant information that may be required by an insurance company to provide an electronic insurance information card. The system would operate as described above for the system in FIG. 1, except that the data contained in data storage 129 would relate to insurance policies, insurance coverage, name of the insured, VIN of vehicle insured, in sum, all the data that would include or relate to information necessary to create an insurance information card or a proof of insurance card. Optionally, the system would include a second handheld electronic device 41 having a display screen 143 that is operated by a person requiring the insurance information for the user of handheld electronic device 113. For example, in the case of an accident or a traffic stop, the operator of the handheld electronic device 141 may be a police officer requesting the user's proof of insurance card, or may be another person involved in an accident that requires the user's insurance information for the purpose of making a claim.

The requirements for an electronic official document depends on how the electronic official document will be used. For example, as stated above, if an electronic insurance information card is being provided for contact information purposes only, the need for authentication of the electronic insurance information card would not be very high. If on the other hand, the electronic insurance information card is being presented as proof of insurance to a police officer, there may be a need to provide some authentication of the document that can be validated by the police officer. This may be accomplished through a number of existing technologies, including digital signatures attached to the electronic official document.

Figure 4:
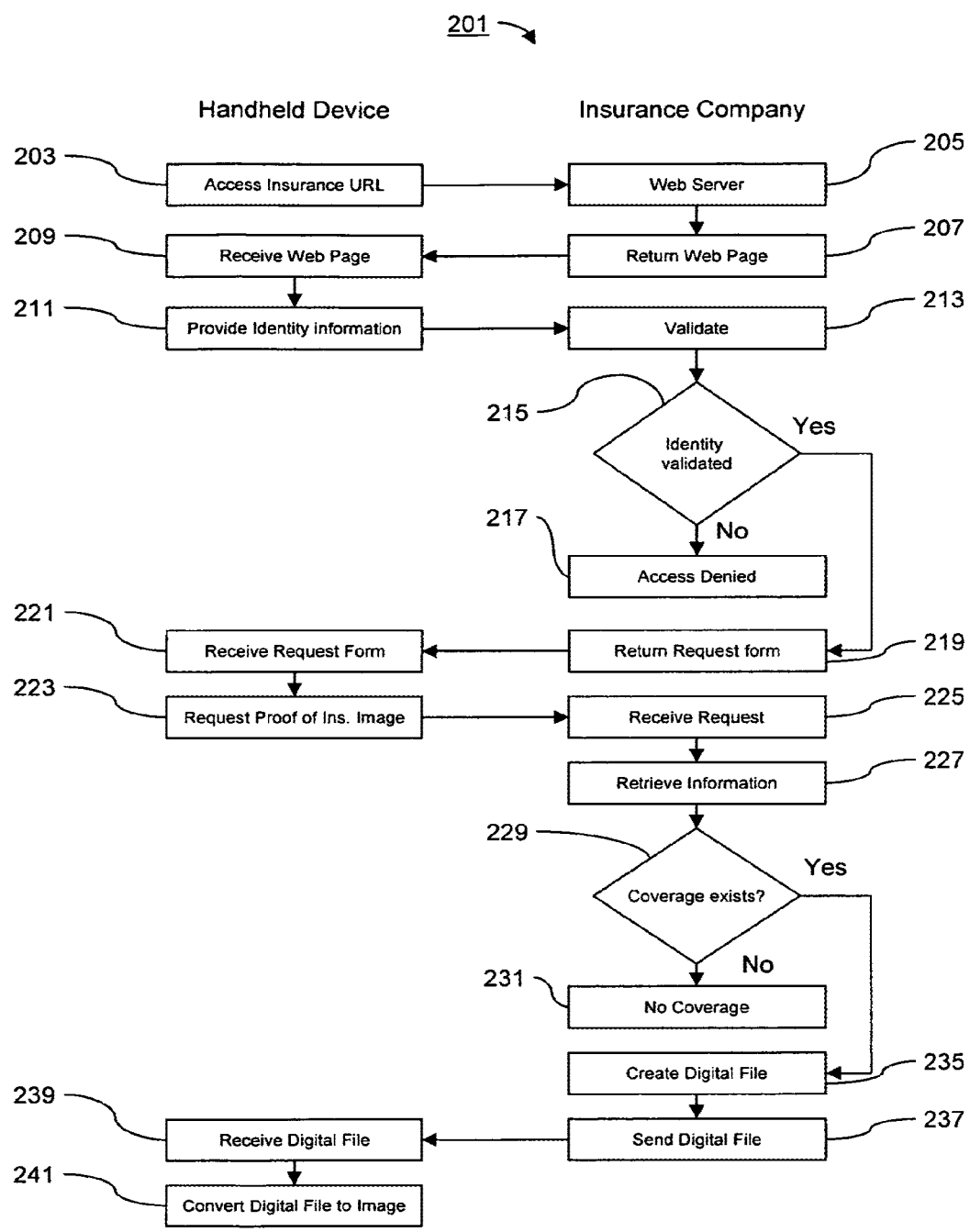
FIG. 4 is a flowchart of the methods implemented by an insurance company and a handheld electronic device for providing and displaying an electronic insurance information card.

FIG. 4 is a flowchart that illustrates one methodology that can be implemented by the system described above in providing electronic insurance documents, such as proof of insurance, to a user. The flowchart is divided into two columns, with the method elements implemented in a handheld electronic device on the left and the method elements that may be implemented by an insurance company on the right. The methodology 201 includes obtaining access to an insurance company's web site through a handheld electronic device (method element 203). In method element 205 the web server would receive the request for access and return a web page (method element 207) to the handheld electronic device. The web page may be a document in XML format with a call to a graphical format file. The handheld electronic device would receive the web page (method element 209) which may be a web form requesting certain information from the user of the handheld electronic device. To be able to access official documents the user of the handheld electronic device would provide identity information in method element 211. This identity information may be a user name and password to access a protected area of the web site, and may include, in addition, a personal identification number (PIN) that is associated with the user of the handheld electronic device. The insurance company validates the information submitted (method element 213) to determine if the user of the handheld electronic device has access to the information requested. As illustrated by decision node 215, if the identity cannot be validated, access would be denied (method element 217). If the user's identity is validated entry is provided into the protected area of the web site and a web page request form may be provided (method element 219). The user of the handheld electronic device receives the request form in method element 221 and requests the proof of insurance image (method element 223). The insurance company would receive the request (method element 225) and since the identity of the user has already been validated, the system can then search the data storage unit and retrieve information associated with the handheld electronic device user (method element 227). This would include all of the information necessary to provide proof of insurance for any vehicle that is insured by the insurance company in the name of the user of the handheld electronic device. In decision node 229 a determination would be made about whether coverage exists for the user of the handheld electronic device. If no coverage exists, (method element 231) the process may end, or alternately a form may be returned to the user, or an e-mail sent, indicating that there is no coverage. If a record associated with the user is found, a digital file is created (method element 235) and sent to the user (method element 227). The user's handheld electronic device would receive the file (method element 239) and convert it to an image in the display of the handheld electronic device.

There are numerous ways of creating a digital file in a graphic file format. The system may store digital files of scanned images of the electronic insurance documents in a database that associates each image of the electronic insurance document with a specific user. Alternately, the system may utilize data ordinarily stored in the insurance company's system (e.g. policy data) and use the data in conjunction with a graphical template to create an electronic version of the insurance documents.

There are also different uses for official documentation such as a proof of insurance card. For example, in the case of automobile insurance, the proof of insurance card serves as a convenient way of providing a user with the information that must be conveyed to another person (e.g., someone who may have been involved in an accident). In such a case, the proof of insurance card is being used for information purposes only. Alternately, the proof of insurance card may be demanded by a police officer who wants to verify that the user is complying with the legal requirement of carrying automobile insurance. In such cases there may be a need to validate the source of the information being displayed on the screen.

FIG. 4 illustrates a methodology 251 that is implemented using electronic mail. In this method the user of the handheld device has sent an e-mail request (including a personal identification number user name and password) to an insurance company to request a proof of insurance card. The insurance company would receive the e-mail (method element 255) and determine whether the user name, password and personal identification number can be validated in the system (decision node 257). If the user information cannot be validated access to the remainder of the process will be denied (method element 259), and an e-mail informing the user that access has been denied may be sent to the user. If the user's identity information can be validated, the system would search for a policy associated with the user's identity information (method element 261). If the policy is not found (decision node 263), the system would send a reply e-mail to the user indicating that there is no coverage (method element 265) this reply email would be received by the user electronic mailbox and may be viewed by the handheld device (method element 267). If the system finds coverage information associated with the user's personal information, the system would create a digital file (method element 269) which would comprise an electronic representation of a proof of insurance card in an electronic graphic file format. The digital file would be attached to a reply e-mail (method element 271) and sent to the user's e-mail address (method element 273). The user may then open the e-mail by using the handheld electronic device (method element 275) and detach and convert the file into an image on the display all for the handheld electronic device (method dement 277).

Figure 5:
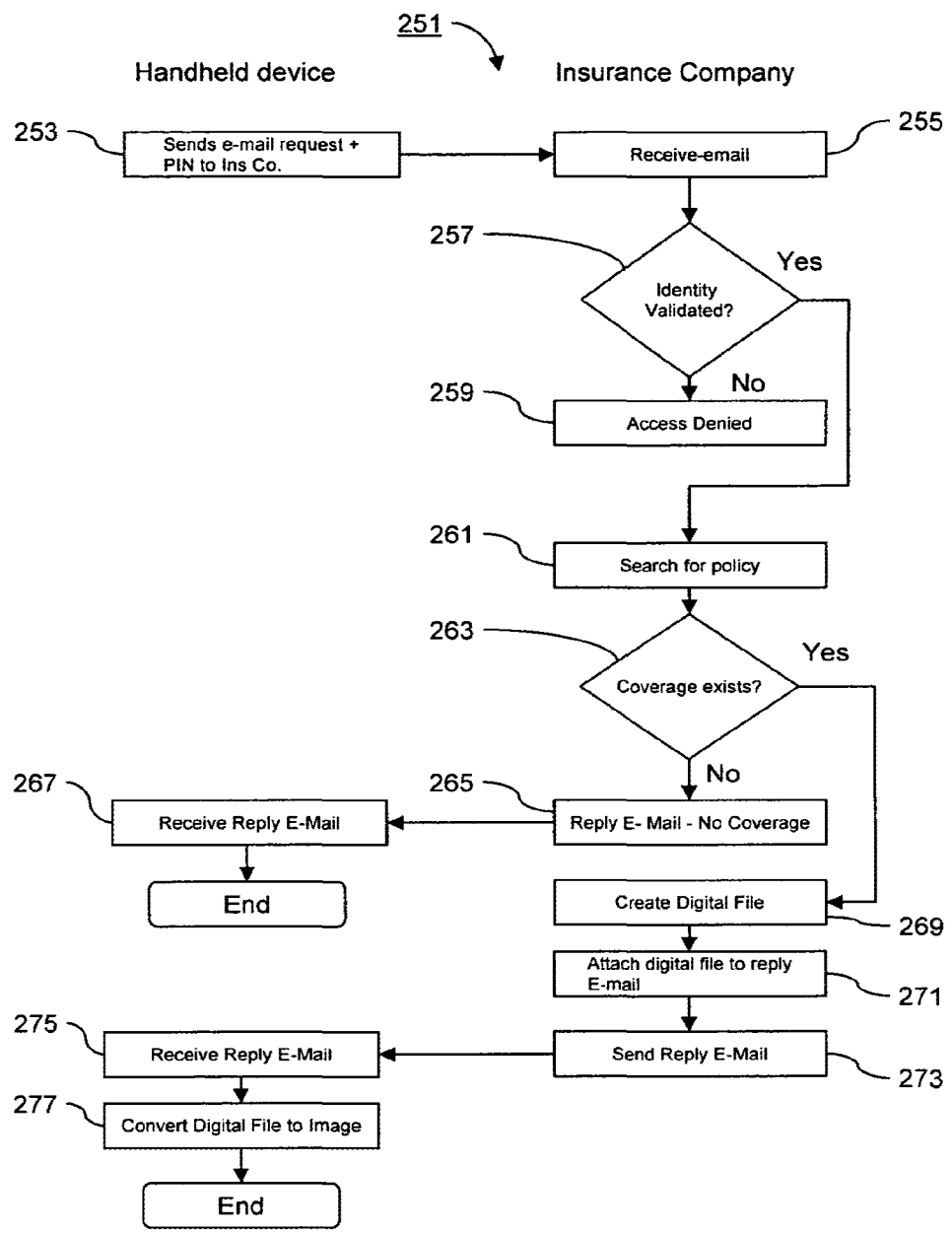
FIG. 5 is a flowchart of an alternate method implemented by an insurance company and a handheld electronic device for displaying an electronic insurance information card.
Figure 6:
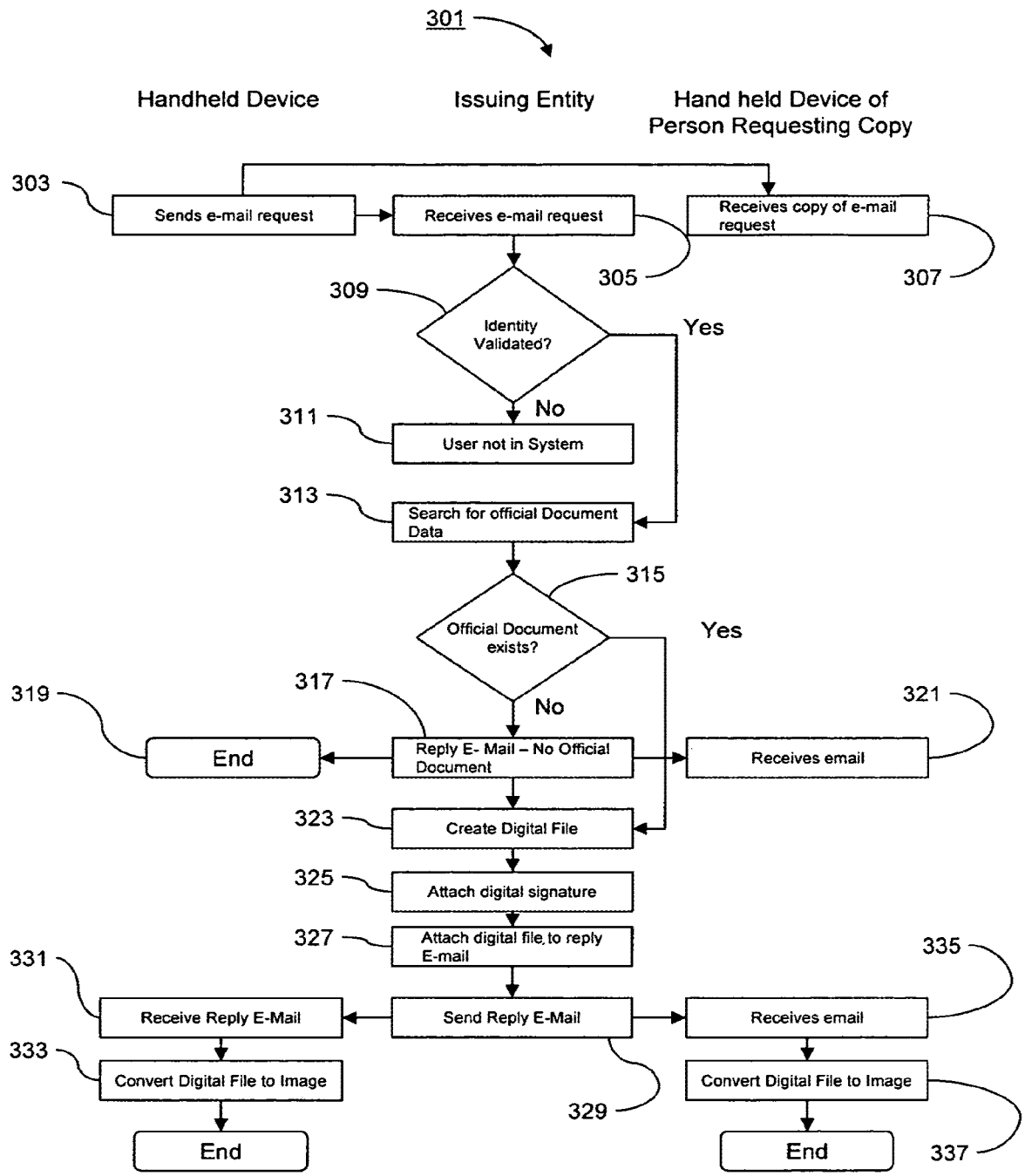
FIG. 6 is a flowchart of the method for providing and displaying an official document to a person requesting a copy of the official document.

Illustrated in FIG. 5 is a methodology where an issuer of an official document provides a person that wants to make sure that the official document is authentic, with a copy of the document to the person's handheld electronic device. In this methodology electronic mail is used for making the request and sending the document. The user would send an e-mail request (method element 203) to the issuing entity, with a copy the person requesting the copy. Clearly, in this situation that person requesting a copy must provide the user with their e-mail address. In the case of an automobile traffic stop, the driver may be requested to show proof of insurance, and may request that the police officer provide an e-mail address to which the insurance company may send a copy of the proof of insurance document. The issuing entity would receive the e-mail request from the user (method element 205) and the person requesting the copy would receive a copy of the e-mail request at a designated e-mail address. That person could view the copy of the email request on his/her handheld electronic device. The e-mail may be a preformatted e-mail with all of the relevant identification information that is created by the document application 24 in the user's handheld electronic device. The user accesses the document application that then requests that a copy of the electronic official document be sent to the person requesting the copy. The document application 26 then formulates an e-mail including all of the identification information necessary to validate the user on issuing entity's system. In decision node 209 the user is validated based on the information provided. If the user information provided in the e-mail cannot be validated, then a determination would be made that the user is not in the system (method element 211) and an e-mail may be sent to the user and the person requesting the copy (not shown). If the user information is validated, then the issuing entity's system searches for the official document (method element 213). If a document is not found (see decision node 215), then the issuing entity's system would send an e-mail (method element 217) to the user of the handheld electronic device (method element 219) and to the person requesting the copy of the official document (method element 221) noting that no official document was found. If the official document exists, then the issuing entity's system would create a digital file (method element 223), attach a digital signature to the digital file (method element 225), attach the digitally signed file to a reply e-mail (method element 227) and send the e-mail to the user of the handheld electronic device and the person requesting a copy (method element 229). The technology for attaching a digital signature to a document is now quite common. Using a digital signature (or public-key digital signature) permits digital information to be authenticated in a way analogous to how ordinary physical signatures permit paper document authentication. The method may be implemented using public-key cryptography. Digital signatures are created by hashing data to produce a number that uniquely identifies the contents in a way that any change would no longer produce the same number. That number is then encrypted with a person's encryption keys to prove that it belongs to the person who is associated with the keys. Digital signature technologies commercially available include Yozon's "Signed & Secured," Public Key Infrastructure (PKI), RSA by RSA Security, among others.

The user receives the e-mail with the attached digitally signed by document (method element 231). The handheld electronic device retrieves the e-mail and converts the digital file into an image (method element 233). Similarly, the person requesting the copy would receive the e-mail and access the e-mail through their handheld electronic device (method element 235) and display the attachment as an image (method element 237).

Although the systems and methods have been described with reference to specific embodiments, this description is not meant to be construed in a limited sense. Various modifications of the disclosed embodiments, as well as alternative embodiments of the system and method, will become apparent to persons skilled in the art upon reference to the description of the embodiments disclosed herein. Therefore, it is contemplated that the appended claims will cover such modifications that fall within the scope of the various embodiments.

The invention claimed is:

1. A system, comprising:
    a graphic template subsystem having a graphic file format template to be customized with particular information about at least one person to create a digital representation of at least one authentication document for the at least one person;
    a database storing the particular information about the at least one person;
    a computing device coupled to the database through a first data interface and to the graphic template subsystem through a second data interface, wherein the computing device includes a computer processor and computer-readable code stored on a non-transitory computer-readable medium which when executed causes the computer processor to:
        integrate the particular information associated with the at least one person into the graphic file format template, create the digital representation of the at least one authentication document for the at least one person based on the integration, and store the digital representation in the database;
        attach an encrypted digital signature authenticating an issuing entity of the digital representation of the at least one authentication document to the digital representation of the at least one authentication document;
        associate authentication information about the at least one person with the digital representation of the at least one authentication document;
        receive a request, from a first electronic device, to provide a digital identification of the at least one person to a second electronic device, wherein the request includes the authentication information about the at least one person;
        validate an identity of the at least one person based upon the authentication information about the at least one person included in the request;
        upon validation of the identity of the at least one person, retrieve the digital representation of the at least one authentication document for the at least one person from the database;
        create the digital identification of the at least one person through encrypting the digital representation of the at least one authentication document;
        provide the second electronic device with a key, associated with the system, that allows the second electronic device to verify that the digital identification is authentic; and
        transmit the digital representation of the authentication document to the second electronic device, wherein the second electronic device employs the key to verify that the digital representation of the at least one authentication document is authentic.

2. The system of claim 1, wherein the computing device includes a data interface including a network connection; and
    wherein the computer processor, upon execution of the computer readable code, further causes the computer processor to: receive the request through the network connection.

3. The system of claim 1, wherein the computing device includes a local data interface; and
    wherein the computer processor, upon execution of the computer readable code, further causes the computer processor to: receive the request via the local data interface.

4. The system of claim 1 wherein the computer processor, upon execution of the computer readable code, further causes the computer processor to:
    identify an originating entity of the request; and
    determine that the originating entity is entitled to send the request.

5. The system of claim 1 wherein the digital identification includes a visual representation of an identification document.

6. The system of claim 5 wherein the computer processor, upon execution of the computer readable code, further causes the computer processor to:
   create a web page including a reference to a graphical format file of the visual representation; and
   return the web page to the second electronic device, wherein the second electronic device displays the web page.

7. The system of claim 6, wherein said web page is an XML page with a call to said graphical format file.

8. The system of claim 6, wherein the computer processor, upon execution of the computer readable code, further causes the computer processor to: cause the computer processor to send an e-mail including an attachment of said graphical format file.

9. The system of claim 6, wherein said graphical format file comprises at least one format selected from the group of formats consisting of: Graphic Interchange Format (GIF); Joint Photographic Experts Group (JPEG); Portable Document Format (PDF); and Portable Network Graphic (PNG).

10. The system of claim 1, wherein the digital identification is created through public key/private key encryption.

11. The system of claim 1, wherein the key is provided to the second electronic device prior to receipt of the request.

* * * * *